(12) United States Patent
Nouard et al.

(10) Patent No.: US 11,842,024 B2
(45) Date of Patent: Dec. 12, 2023

(54) SYSTEM AND METHOD FOR INTELLIGENT POLYMORPHISM OF USER INTERFACE

(71) Applicant: Business Objects Software Limited, Dublin (IE)

(72) Inventors: Arnaud Nouard, D Huison Longueville (FR); Raphael Geoffroy, Colombes (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 0 days.

(21) Appl. No.: 17/039,136

(22) Filed: Sep. 30, 2020

(65) Prior Publication Data

US 2022/0100299 A1 Mar. 31, 2022

(51) Int. Cl.
*G06F 3/048* (2013.01)
(52) U.S. Cl.
CPC .................... *G06F 3/048* (2013.01)
(58) Field of Classification Search
CPC ....... G06F 3/048; H04L 67/22; H04L 67/306; G06N 3/08; G06N 20/00
See application file for complete search history.

(56) References Cited

U.S. PATENT DOCUMENTS

| | | | | |
|---|---|---|---|---|
| 6,377,286 B1 * | 4/2002 | Hochmuth | .......... | G06F 3/04817 715/810 |
| 8,805,816 B2 * | 8/2014 | Kimball | ................. | G06F 3/0481 715/810 |
| 2015/0195179 A1 * | 7/2015 | Skare | ................. | G06F 3/0482 715/745 |
| 2017/0060232 A1 * | 3/2017 | Ben-Yair | ............. | G06F 3/04842 |
| 2019/0033965 A1 * | 1/2019 | Raghunath | ............. | G06F 3/013 |
| 2019/0171283 A1 * | 6/2019 | Dey | ........................ | G06N 20/00 |
| 2020/0104148 A1 * | 4/2020 | R | ............................ | G06F 3/167 |
| 2020/0114931 A1 * | 4/2020 | Rao | .................... | G06K 9/00892 |
| 2020/0125586 A1 * | 4/2020 | Rezaeian | .............. | G06F 16/285 |
| 2020/0133692 A1 * | 4/2020 | Rohde | ........................ | G06F 8/36 |
| 2020/0159862 A1 * | 5/2020 | Kleiner | ................. | G06F 16/248 |
| 2020/0201544 A1 * | 6/2020 | Wooster | .................. | G06F 21/32 |
| 2021/0326155 A1 * | 10/2021 | Goodsitt | ................ | G06F 3/048 |

* cited by examiner

*Primary Examiner* — Andrew T Chiusano
(74) *Attorney, Agent, or Firm* — Buckley, Maschoff & Talwalkar LLC

(57) ABSTRACT

Embodiments may be associated with a user interface design for an application. An intelligent user interface platform may collect user experience data associated with a user's interactions with the application over time (e.g., user actions, touchscreen interactions, computer mouse clicks, attention information, context information, etc.). The intelligent user interface platform may then analyze the user experience data (e.g., looking for most visited interface locations, most used actions, infrequently accessed functions, common user mistakes, etc.). The intelligent user interface platform may also automatically create a user interface design adjustment based on the analysis. For example, the user interface design adjustment might be associated with a menu item, a sub-menu item, an application action, an icon location, adding a display element, removing a display element, etc.

20 Claims, 14 Drawing Sheets

SYSTEM AND METHOD FOR INTELLIGENT POLYMORPHISM OF USER INTERFACE

BACKGROUND

A user may utilize a computer application to perform tasks. Examples of applications include business information applications, word processing applications, etc. Each application may have a "user interface" with various components that let the user perform tasks, access features, navigate the application, etc. Examples of such components include menus, sub-menus, navigation panes, search boxes, button icons, etc. These user interface components might be arranged in a number of different ways to make certain tasks easier to perform, highlight a particular functionality of the application, etc.

Traditionally, user interfaces are designed so as to target general and common uses cases (e.g., for the "average" user of the application). Despite this, applications may be used in many different ways by different users, e.g. with a focus on various capabilities such as learn, create, assemble, edit, export, and other manipulations. Designing different user interfaces for different types of user, however, requires substantial effort in production phases, including user experience testing, coding experiments, etc. to provide user interfaces that are appropriate for all users, usages, and capabilities. Moreover, no user interface design will achieve 100% user satisfaction. Some users have unusual habits, new users may have different expectations, while other users will never learn about some functionalities, etc.

Some applications offer a powerful user interface customization framework (e.g., Microsoft® OFFICE applications) but these are rarely used. There are several reasons for this, including the fact that the controls are not easy to manipulate. The action mapping may be, for example, too fine grain (e.g., cut, copy, . . . ). Also, users might not know how to be well organized—should it depend on current activity? Should it take into consideration future usage situations? Many users may be afraid to detach their user interfaces from the default settings (e.g., wanting to avoid a high personal Total Cost of Ownership ("TCO").

It would be desirable to provide user interface customization in an automatic and appropriate manner.

SUMMARY

Methods and systems may be associated with a user interface design for an application. An intelligent user interface platform may collect user experience data associated with a user's interactions with the application over time (e.g., user actions, touchscreen interactions, computer mouse clicks, attention information, context information, etc.). The intelligent user interface platform may then analyze the user experience data (e.g., looking for most visited interface locations, most used actions, infrequently accessed functions, common user mistakes, etc.). The intelligent user interface platform may also automatically create a user interface design adjustment based on the analysis. For example, the user interface design adjustment might be associated with a menu item, a sub-menu item, an application action, an icon location, adding a display element, removing a display element, etc.

Some embodiments comprise: means for collecting, by a computer processor of an intelligent user interface platform, user experience data associated with a user's interactions with the application over time; means for analyzing the user experience data; and means for automatically creating a user interface design adjustment based on the analysis.

Some technical advantages of some embodiments disclosed herein are improved systems and methods to provide user interface customization in an automatic and appropriate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
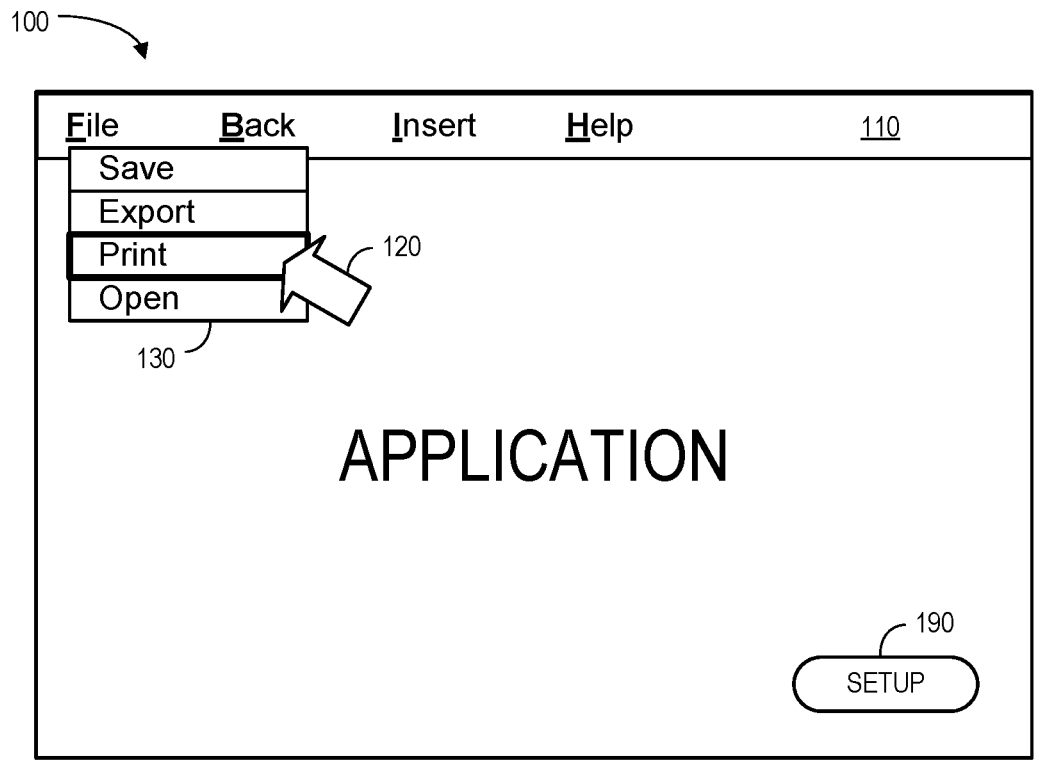
FIGS. 1A and 1B illustrate user interfaces according to some embodiments.
Figure 1B:
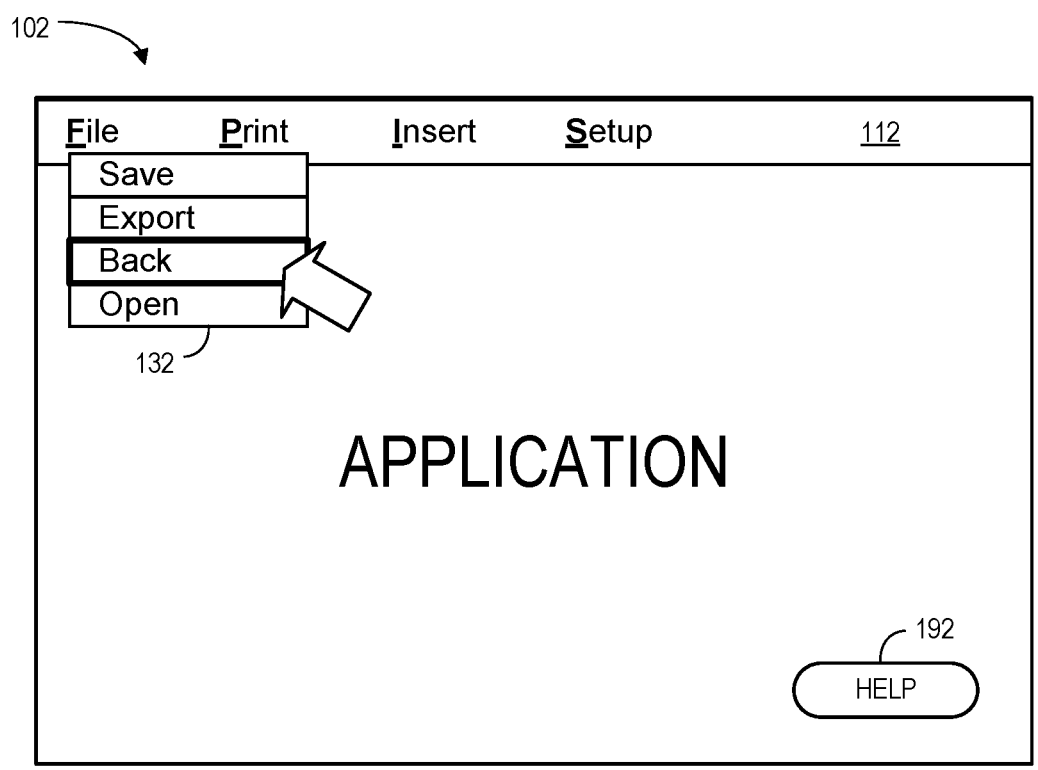

A user may utilize a computer application to perform tasks. Examples of applications include business information applications, word processing applications, etc. Each application may have a "user interface" with various components that let the user perform tasks, access features, navigate the application, etc. Examples of such components include menus, sub-menus, navigation panes, search boxes, button icons, etc. FIGS. 1A and 1B illustrate user interfaces 100, 102 according to some embodiments. FIG. 1A shows a user interface 100 with a "toolbar" 110 (e.g., including "File," "Back," "Insert," etc.) that, when selected by a touchscreen or computer mouse pointer 120, may result a drop-down menu 130 of options (e.g., "Save," "Export," "Print," etc.). The interface 100 further includes a "Setup" stand-alone button icon 190 that may be directly selected by the user. FIG. 1B shows a slightly modified user interface 102 with "Print" being moved to a toolbar 112, "Back" being moved to a drop-down menu 132, and a "Help" stand-alone button icon 192 that may be directly selected by the user. These user interface components might be arranged in a number of different ways to make certain tasks easier to perform, highlight a particular functionality of the application, etc. Designing appropriate user interfaces for different users, different types of users, different use cases, etc., however, can be a time-consuming and expensive task.

Instead of targeting everyone and every usage with a single user experience, embodiments described herein provide user interface customization in an automatic and appropriate manner. In particular, some embodiments may avoid the "one size fits all" interface aspect of traditional designs and lead to a custom-tailored user experience. Embodiments may comprise an intelligent system that is designed to provide automatic customization of user interface via user interface "polymorphism." As used herein, the term "polymorphism" may refer to items that occur in several different forms.

Figure 2:
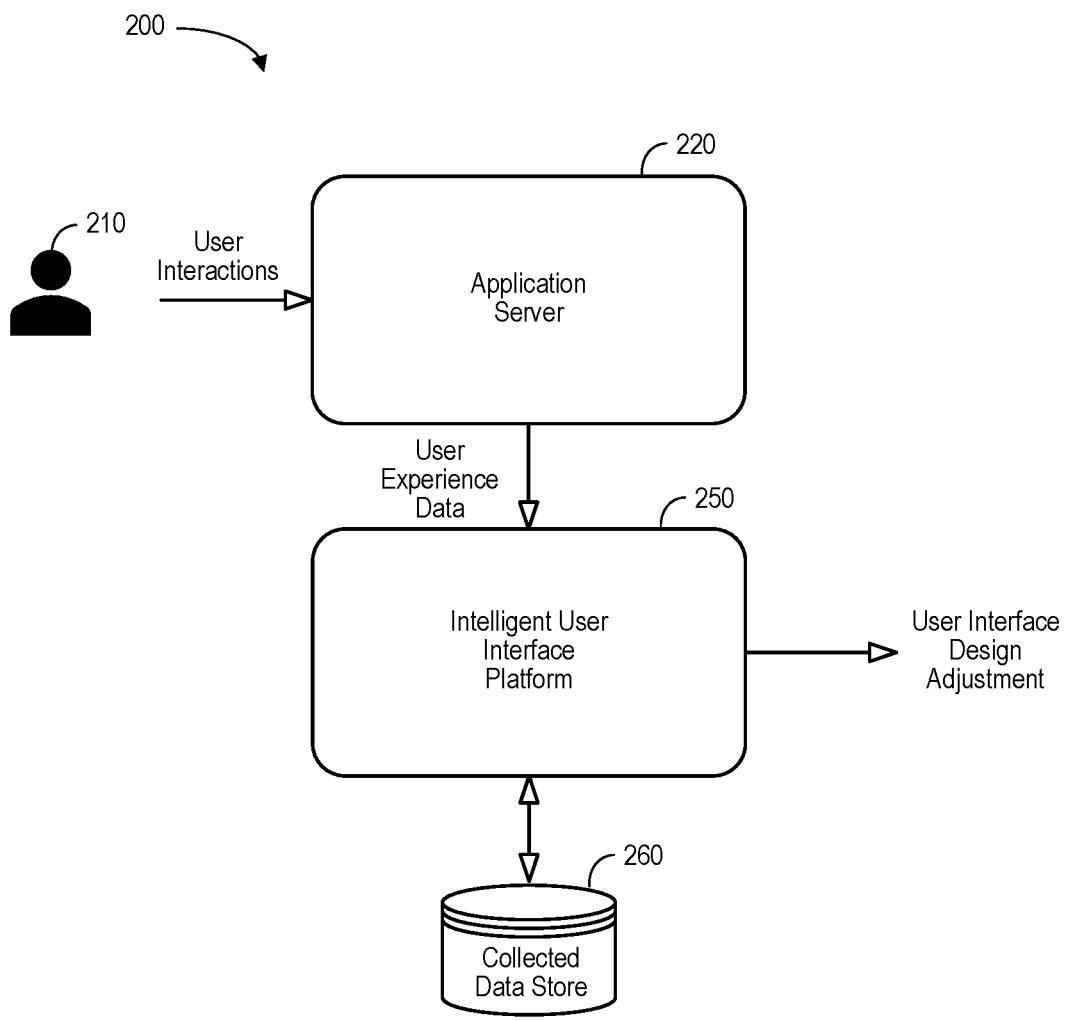
FIG. 2 is high-level diagram of an intelligent user interface system in accordance with some embodiments.

FIG. 2 is a system 200 in accordance with some embodiments. In particular, an application user 210 may exchange user interactions with an application server 220 while using an application (e.g., button selections, mouse clicks, etc.). The system 200 includes an intelligent user interface platform 250 that collects user experience data and stores the information in a collected data store 260. The intelligent user interface platform 250 may analyze the information in the collected data store 260 and output an appropriate user interface design adjustment for the application user 210.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The system 200 may store information into and/or retrieve information from various data stores (e.g., the collected data store 260), which may be locally stored or reside remote from the intelligent user interface platform 250. Although a single intelligent user interface platform 250 is shown in FIG. 2, any number of such devices may be included. Moreover, various devices described herein might be combined according to embodiments of the present invention. For example, in some embodiments, the intelligent user interface platform 250 and application server 220 might comprise a single apparatus. The system 200 functions may be performed by a constellation of networked apparatuses, such as in a distributed processing or cloud-based architecture.

A user may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations, alerts, or results from the system 200.

Figure 3:
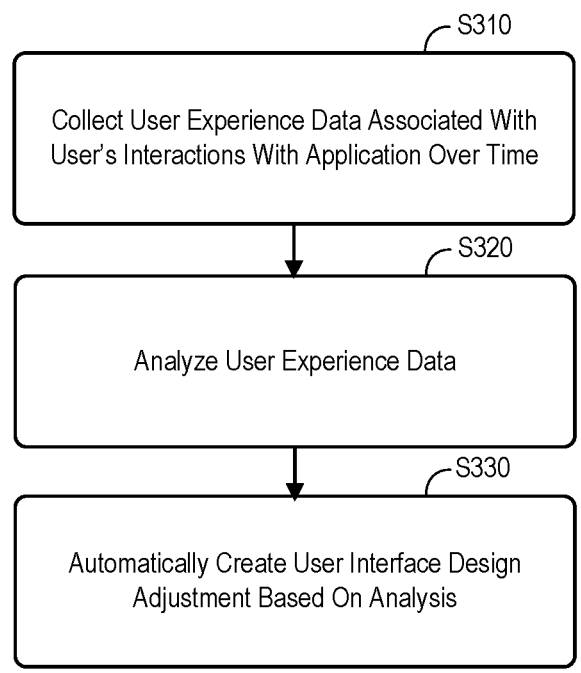
FIG. 3 is an intelligent user interface method according to some embodiments.

FIG. 3 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S310, a computer processor of an intelligent user interface platform may collect user experience data associated with a user's interactions with the application over time. The user experience data might be associated with, for example, user actions, touchscreen interactions, computer mouse clicks, attention information (e.g., a camera might detect "where the user is looking"), context information, a document type, user profile information (e.g., is the user a salesperson or manager), a time and date (e.g., is it a weekend?), a location (e.g., what country is the user in?), etc.

At S320, the system may analyze the user experience data. The analysis may be associated with, for example, the user's most visited interface locations, most used actions, infrequently accessed functions, common user mistakes, multiple users, multiple applications, etc. According to some embodiments, the analysis is associated Artificial Intelligence ("AI") and/or Machine Learning ("ML").

At S330, the system may automatically create a user interface design adjustment based on the analysis. The user interface design adjustment might be associated with, for example, menu item, a sub-menu item, an application action, an icon location, adding a display element, removing a display element, etc.

According to some embodiments, the system may watch user interactions, learn from those interactions, suggest improvements to the user interface, and then continue to learn by watching future user interactions. Such an approach may require analyzing the end user with his/her agreement. Note that modern technics may be used to collect the required data and knowledge that will be processed to lead to a better adapted user interface. For example, during a first stage, the software could be delivered with built-in "perspective" to better target a particular type of application use, e.g., "What do you want to do with this application?" Based on a user input/selection, a specialized perspective might be selected. Subsequently, based on an intelligent user interface system, the software may warn the user about the capture of his or her usage, e.g., clicks, habits, regular ways of performing tasks, hesitations before taking certain tasks, etc.

Figure 4:
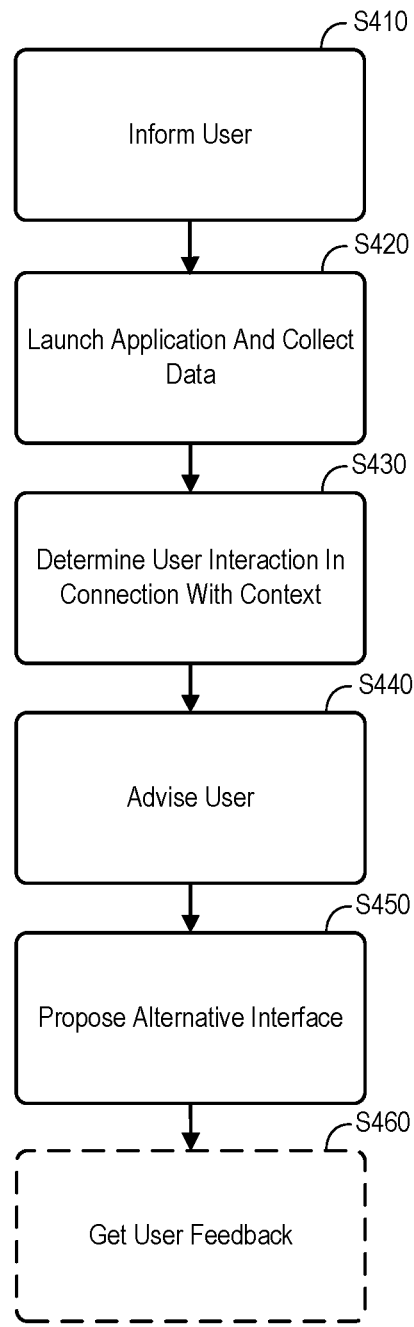
FIG. 4 is a more detailed user interface polymorphism method in accordance with some embodiments.

FIG. 4 is a more detailed user interface polymorphism method in accordance with some embodiments. At S410, the system may inform the user about the intent to collect user interface data. For example, the following message might be displayed: "Dear user, to improve and personalize your user experience, the current software will collect your usage and will help you to master functionalities and will propose alternative graphical interfaces." At S420, the system may begin to gather information. For example, when an application is launched, the system may:
- collect all important identifiers (e.g., context of usage, document type, user profile information, date and other meta data to classify further data),
- in real time, the system may record all actions performed by the user (e.g., menus, search questions/answers, moves, timestamps, etc.), and
- classify and store the data per user, per document, per date, etc.

At S430, the system may then determine, in regards of a context: the most visited interface locations, the most used actions, less commonly used functions, the user's regular mistakes, etc. At S440, after the system has collected, cleaned, and analyzed enough data, it may prompt the user and propose to them how to discover functionalities that he/she never uses. At S450, after the data is sufficiently enriched, the system may propose alternatives to the user interface, such as adjustments to hide unused functionalities, sort actions per importance to make them more accessible, etc. Other examples of user interface adjustments include: proposing to publish and share experiences with a software editor; proposing to name and publish the user's experience to other colleagues/teams in the community; and/or perform an optimization of usage by detecting a usage pattern (e.g., "you should do X instead of Y"). In general, the system may propose any number of possibilities based on an artificial intelligence analysis.

To improve the algorithm, the intelligent system may directly get feedback about the proposed experience from the user at S460 (as illustrated by dashed lines in FIG. 4). For example, after proposing one of the previous interface enhancements at S450, the system may ask for feedback from the user, capture his or her answers, and improve the "proposition model" based on those answers. The system may interpret answers and/or capture the "intent" of the user as well (to help weigh future propositions).

Figure 5:
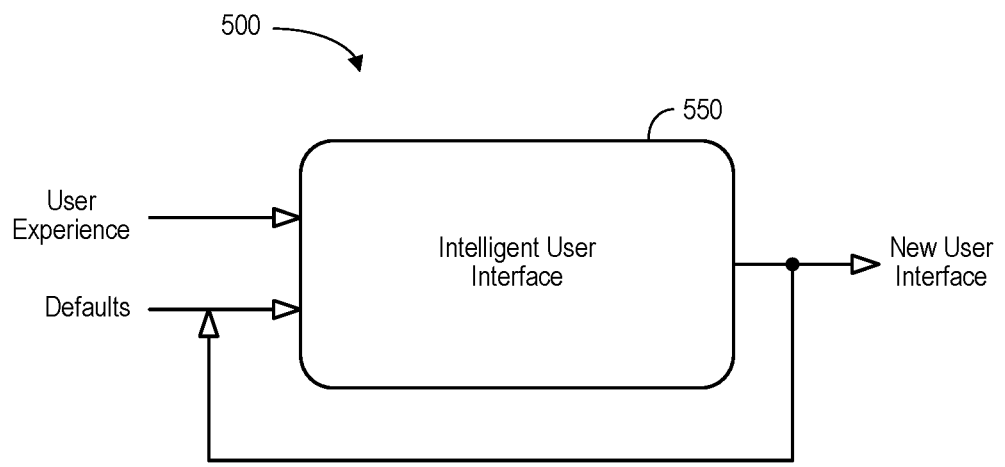
FIG. 5 is an intelligent user interface system according to some embodiments.

With an intelligent user interface, the system may be based on real user experiences and a continuous improvement process. Using modern technics of machine learning, the system can learn from user actions and mistakes. In addition, the context of usage (profile, document type, etc.) may be important and can be considered for relevant suggestions. For example, FIG. 5 is an intelligent user interface system 500 according to some embodiments. The system 500 includes an intelligent user interface 550 that receives user experiences along with default weights for various interface components. The intelligent user interface 550 automatically generates a new user interface and captures feedback to adjust the default weights. In addition to data collection and data clustering, the system 500 may provide an immediate return of experience from the user which can be added to the system to evaluate the impact of each automatic decision. Even if the system is not accurate at the beginning, in a specific context, it may be improved by user's feedback about previous propositions. Consider, for example, the following exchange an intelligent user interface (IUI) and a user:

IUI: Did you like the new interface I suggested? Yes/No
User: "No."
IUI: Between the three changes I made, which ones were wrong?
User: "The 'Refresh' button in the main page."
IUI: I understand. I will fix that and come back with a new suggestion.

By using a learning mechanism, the system may detect user habits and, by doing so, be able to recognize user intentions. As a result, accurate propositions can be offered, such as "would you like to merge these two datasets, like you did yesterday in your forecast document?" or "it seems you want to classify these data in a visualization, I suggest that you . . . ".

Intelligent user interface embodiments may offer a "win-win" situation for software editors. They may be able to deliver a product faster, with a best "generic" user interface. Later, thanks to the collected software usage and an intelligent UI system, the "generic" interface may be regularly improved based on concrete user interactions with the tool. In addition, the system may emphasize less used functionalities and/or highlight new functionalities. In some embodiments, a user community can share personalized usage patterns and/or interface via a centralized repository of settings for customized interfaces. The additional information based on software usage may also ease future investments (enhancements, bug fixes, etc.) and help prioritize any backlog of needed improvements to an application.

Figure 6:
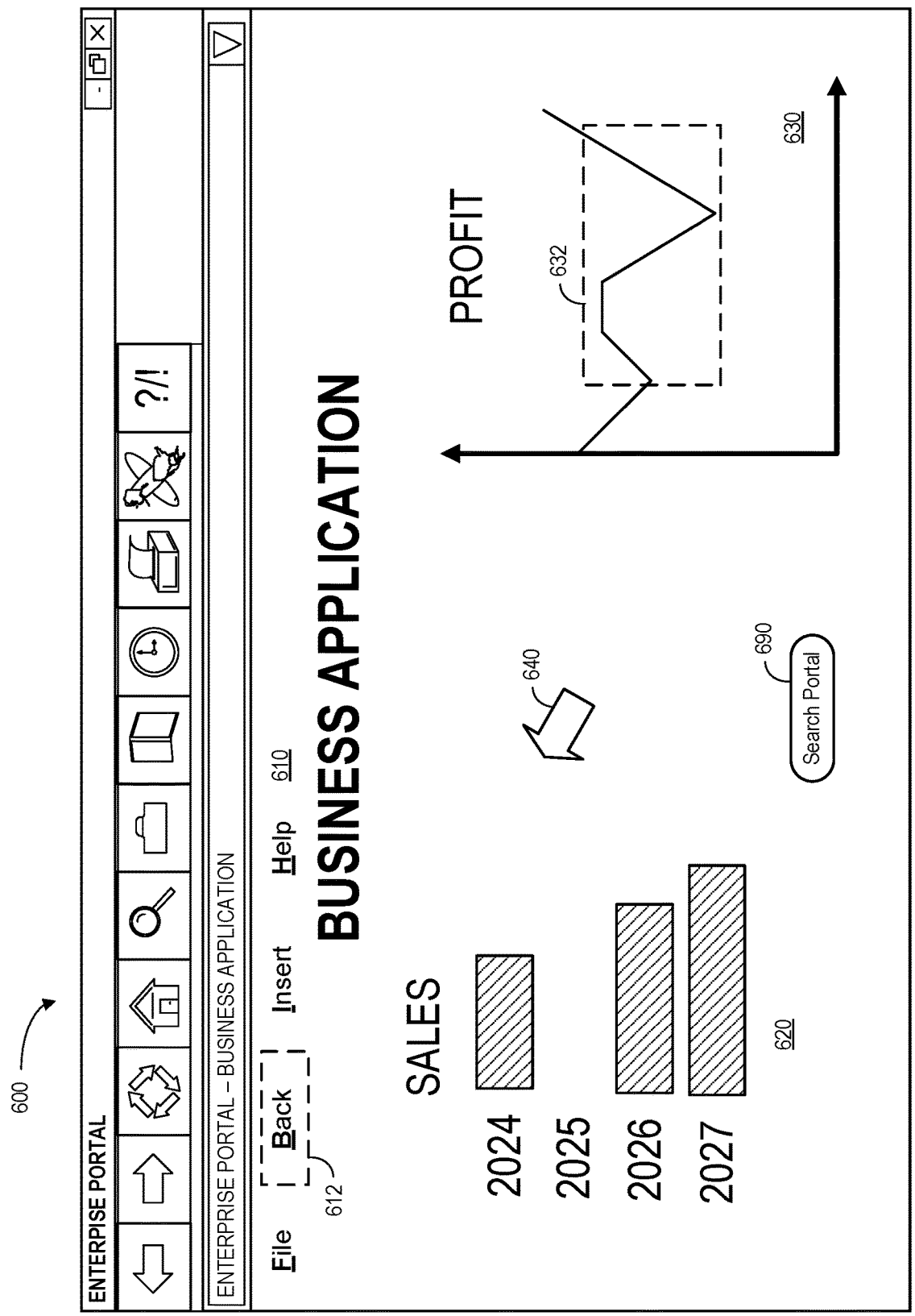
FIG. 6 is a display that illustrates user interface attention in accordance with some embodiments.

Some embodiments may utilize a tracking of usage algorithm that uses a weight of areas approach and a machine learning algorithm to track user activities. For example, FIG. 6 is a display 600 illustrates user interface attention in accordance with some embodiments. The display 600 includes a navigation toolbar 610, a sales information area 620, a profit information area 630 and a "Search Portal" icon 690. The system may track a user's attention to various areas on the display 600, such as the "Back" button 612 in the toolbar and a portion 632 of the profit area 630 (by tracking movement of a computer mouse pointer 640, user eye movements, etc.). Locations where the user interacts the most (612, 632) may be promoted in future adjustments that are automatically suggested for the display 600. That is, based on the user data, the intelligent user interface may enrich its model and propose a brand-new interface based on this specific context.

Thus, embodiments may provide automatic customization of a user interface by making with appropriate suggestions. Each element or workflow of the user interface may have an initial default weight based on usage assumptions from software editor. For example, Table I shows an example of default user interface weight on a scale from 0 to 10 (with 10 representing the most important components of the user interface).

TABLE I

Default UI Weights

| Functions/Areas | Weight |
| --- | --- |
| Save Button | 7/10 |
| Filter Button | 5/10 |
| Page Mode Button | 4/10 |
| Next Page | 7/10 |
| Search | 3/10 |
| Help Button | 6/10 |
| Refresh | 10/10 |

According to these default weights, a software editor may organize the layout of the components (e.g., buttons) that represent these actions. At runtime, these weights may be updated and evolve for each user and each usage. For example, while using the software in a "consumption" or "authoring" mode, the numbers will evolve. Table II shows how the numbers might evolve for a consumption use case.

TABLE II

Consumption Use Case

| Functions/Areas | Default Weight | End User | Usage Weight |
|---|---|---|---|
| Save Button | 7/10 | → | 2/10 |
| Filter Button | 5/10 | → | 9/10 |
| Page Mode Button | 4/10 | → | 1/10 |
| Next Page | 7/10 | → | 8/10 |
| Search | 3/10 | → | 9/10 |
| Help Button | 6/10 | → | 1/10 |
| Refresh | 10/10 | → | 10/10 |

In contrast, Table III shows how the numbers might evolve for an authoring use case.

TABLE III

Authoring Use Case

| Functions/Areas | Default Weight | End User | Usage Weight |
|---|---|---|---|
| Save Button | 7/10 | → | 2/10 |
| Filter Button | 5/10 | → | 3/10 |
| Page Mode Button | 4/10 | → | 6/10 |
| Next Page | 7/10 | → | 2/10 |
| Search | 3/10 | → | 1/10 |
| Help Button | 6/10 | → | 9/10 |
| Refresh | 10/10 | → | 5/10 |

On a continuing basis, the system might ensure that each time an action is performed the corresponding weight will be increased. Similarly, during the same period, if an action is not performed the weight may be decreased.

Once enriched and accurate enough, the updated weights may serve two phases: (1) a tracking usage phase, and (2) an intelligent user interface phase. During the tracking usage phase, the data may be posted to a software editor as "tracking usage" and help prioritize future investments (such as bug fixes, redesign, content enrichment, etc.)

During the intelligent user interface phase, after the weights of given actions set changed significantly (e.g., ~30%), the result of the algorithm may be proposed to the user. For example, a banner at the top of the application might appear stating that "I can propose you a new layout of the application based on your personal experience. Would you like to try it?" According to some embodiments, the proposed automated layout may be cancelled or adjusted by the user. Moreover, the changes may be highlighted in the user interface to help the user better understand where the buttons have moved, which unused functionalities have been deleted, etc. By doing so, the algorithm may be enriched by modifying the weights of impacted areas.

Each area of the user interface may be considered as being composed of containers that are "intelligent." This means that the layout may vary over time based on the real usage of the user sent by the engine. If the container is a toolbar, for example, the most used actions may be directly presented while the less used actions are hidden in a drop-down menu. Similarly, if the container is a side panel, the most used actions will be near the top of the panel. If the container is a contextual menu, the most popular actions will appear higher in the list.

Figure 7:
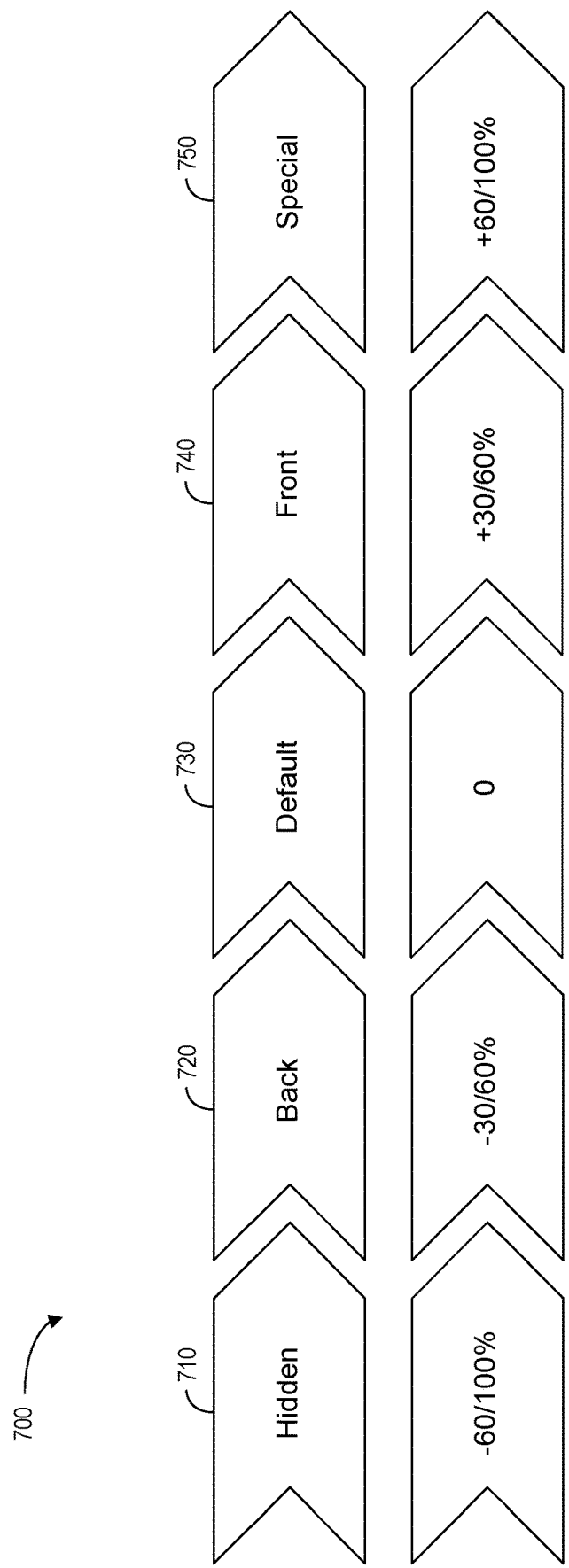
FIGS. 7 through 9 illustrate user interface promotion and/or demotion techniques according to some embodiments.
Figure 8:
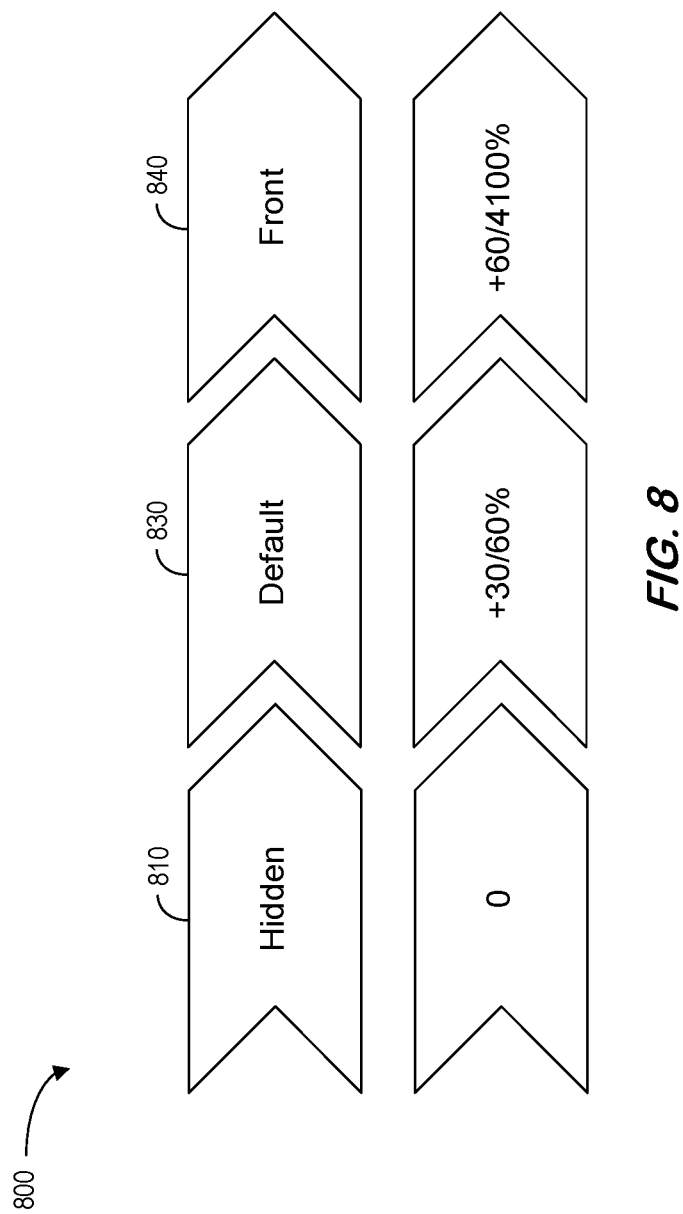
Figure 9:
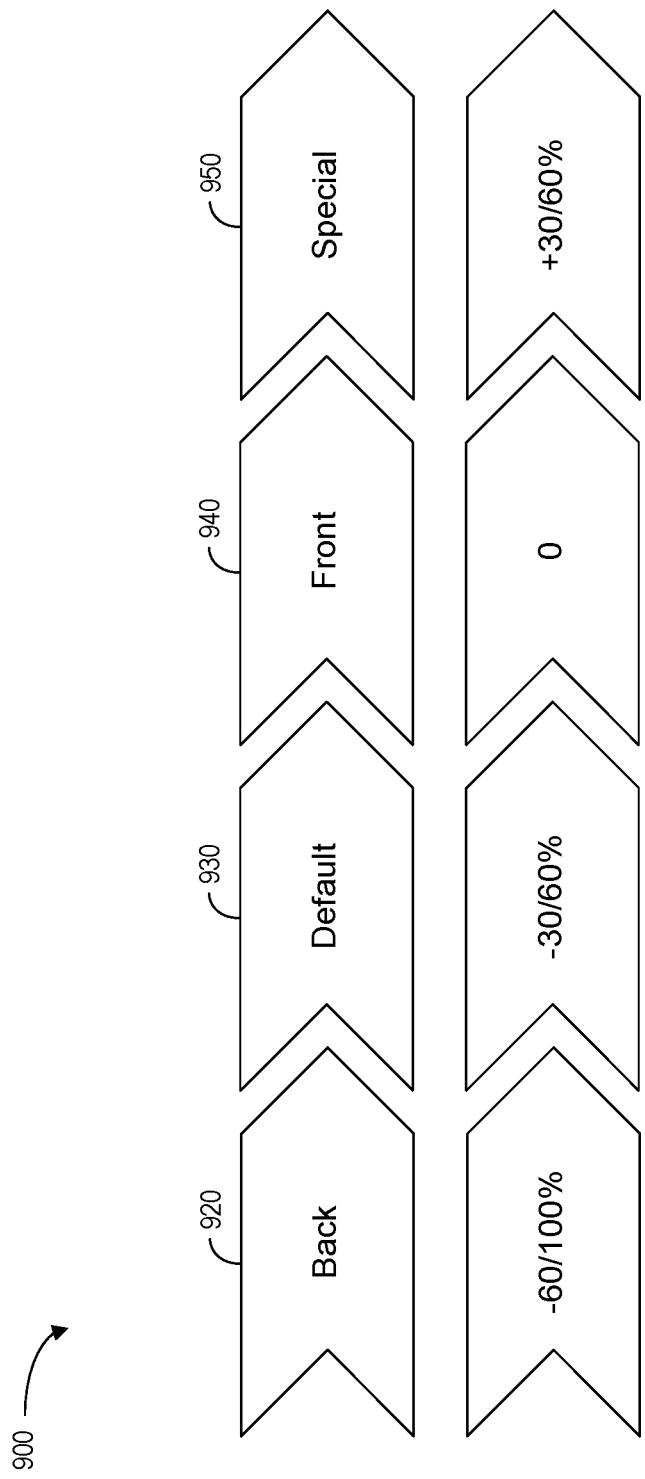

FIGS. 7 through 9 illustrate user interface promotion and/or demotion techniques according to some embodiments. FIG. 7 shows an example 700 of five possible states and associated weight ranges for user interface components: hidden 710 (for the least used actions), back 720, default 730, front 740, and special 750 (for the most used actions).

The actions for which the weights evolve will have different impacts on the user interface. The evaluation may be performed on a use case or contextual basis, such as during a document creation or "authoring" use case shown in Table III. Note that the system expects the user to interact more with some action as compared to others, based on their initial default weights. As soon as the system collects enough accurate data, the difference between expected and actual use may be used to update a lifecycle of states as appropriate.

For example, if the weight of an action evolved, according to the range of usage shown in FIG. 7, its exposition in the UI will be affected. A component's "default location" (e.g., a button or menu item) may move from a very visible place (e.g., a flying menu) to a more hidden place (e.g., a sub-panel). Consider, for example, a default 730 action that has an increase of 70% of usage over what was expected. In this case, the system will set the state to special 750 (because the change is within the 60% to 100% range associated with special 750).

FIG. 8 shows an example 800 where the current state is hidden 810 and might move to default 830 or front 840. For an action currently in the hidden 810 state, an increase of 50% will promote the component to the default 830 location. FIG. 9 shows an example 900 where the current state is front 940 and might move to back 920, default 830, or special 950. For an action currently in the front 940 state, an increase of 50% will promote it to the special 950 state. Based on the new state, the new targeted location may depend on the actual location. Moreover, each intelligent user interface area may be responsible to reorganize the action based on the new states.

Here is an example of an action displayed as a button in an application toolbar by default. For the first occurrence of an update by the system, if the corresponding action weight:
  decreased:
    more than −30/60%, then its state will be demoted to a "back" state. In the user interface, it will be moved to an overflow button (e.g., " . . . ").
    more than −60%, then its state will be demoted to a "hidden" state. It will be moved to another place, such as a global menu bar or sub-panel.
  increased:
    more than 30%, then its state will be promoted to "front" state.
      if currently located in an overflow button, it will be pulled out of the overflow button.
      otherwise, it will be placed in front of actions with lighter weight.
    more than 60%, then its state will be promoted to "special" state. The action will be now located into a very visible toolbar giving a user quick access.

Figure 10:
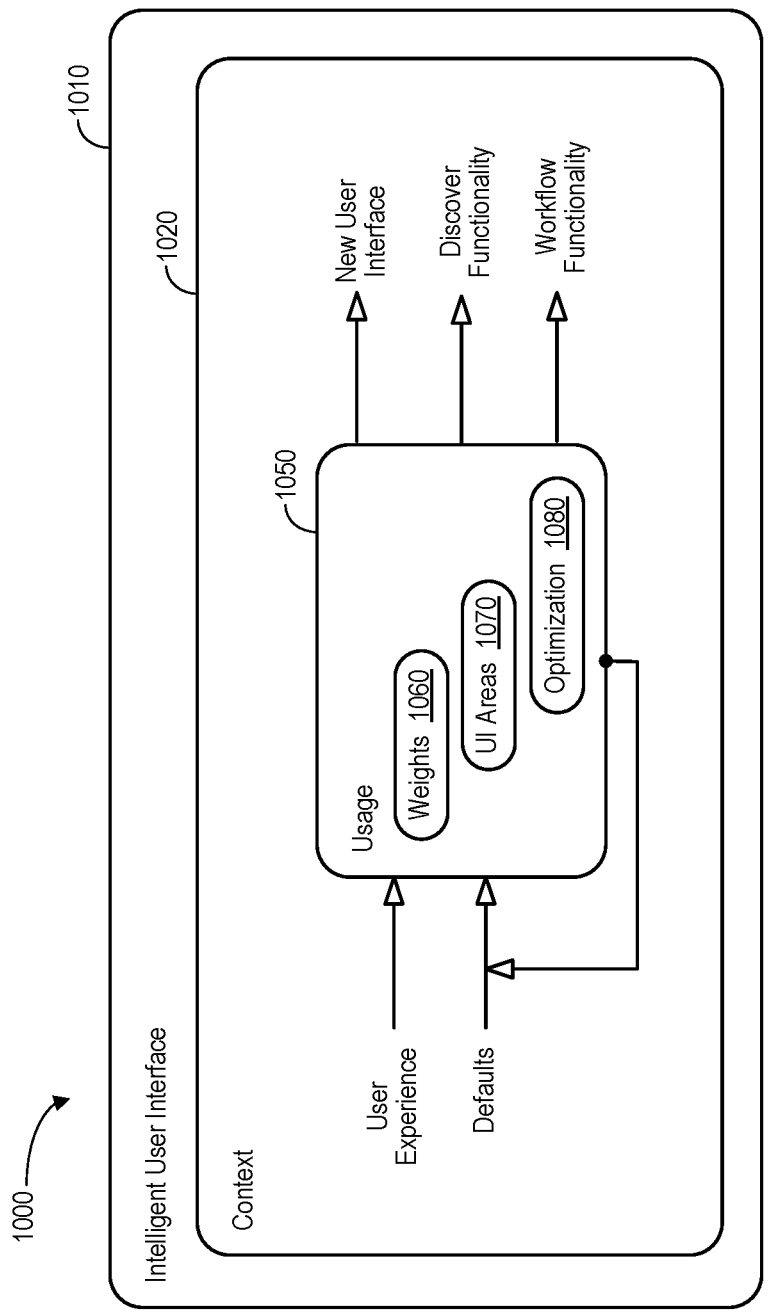
FIG. 10 is a more detailed user interface polymorphism system in accordance with some embodiments.

FIG. 10 is a more detailed user interface polymorphism system 1000 in accordance with some embodiments. The system 1000 includes an intelligent user interface 1010 having a context 1020 with a usage 1050 that receives user experience data and default weights. The usage 1050 may execute weights 1060, user interface areas 1070, and an optimization 1080 to create a new user interface, discover functionality workflow functionality, etc. The optimization 1080 may, for example, recognize usage patterns and propose optimized workflows to the user (and gather user feedback). The optimization 1080 may have boundaries. For example, each intelligent area of the user interface may only welcome a subset of modifications, such as when there is limited screen space in some areas (e.g., a quick access menu). That is, some other areas should not show hundreds of actions (e.g., to avoid huge right-click menus). Therefore, the optimization 1080 may negotiate the weights 1060 with the user interface areas 1070. On top the weight 1060 mechanism, the optimization 1080 may, in some embodiments, ensure consistency in the application. One goal of the optimization 1080 may be to avoid generating strange layouts for actions. For example, the optimization 1080 may take care about functionalities that must always be available (even if they are not used, such as advertisements, etc.). According to some embodiments, the direct interaction with a user of a conversational bot may enrich the optimization 1080. If the user is (or is not) satisfied, the optimization 1080 will refine the strategy. The answers from the user may also modify the calculated weights 1060 (e.g., to help stabilize the system).

Figure 11:
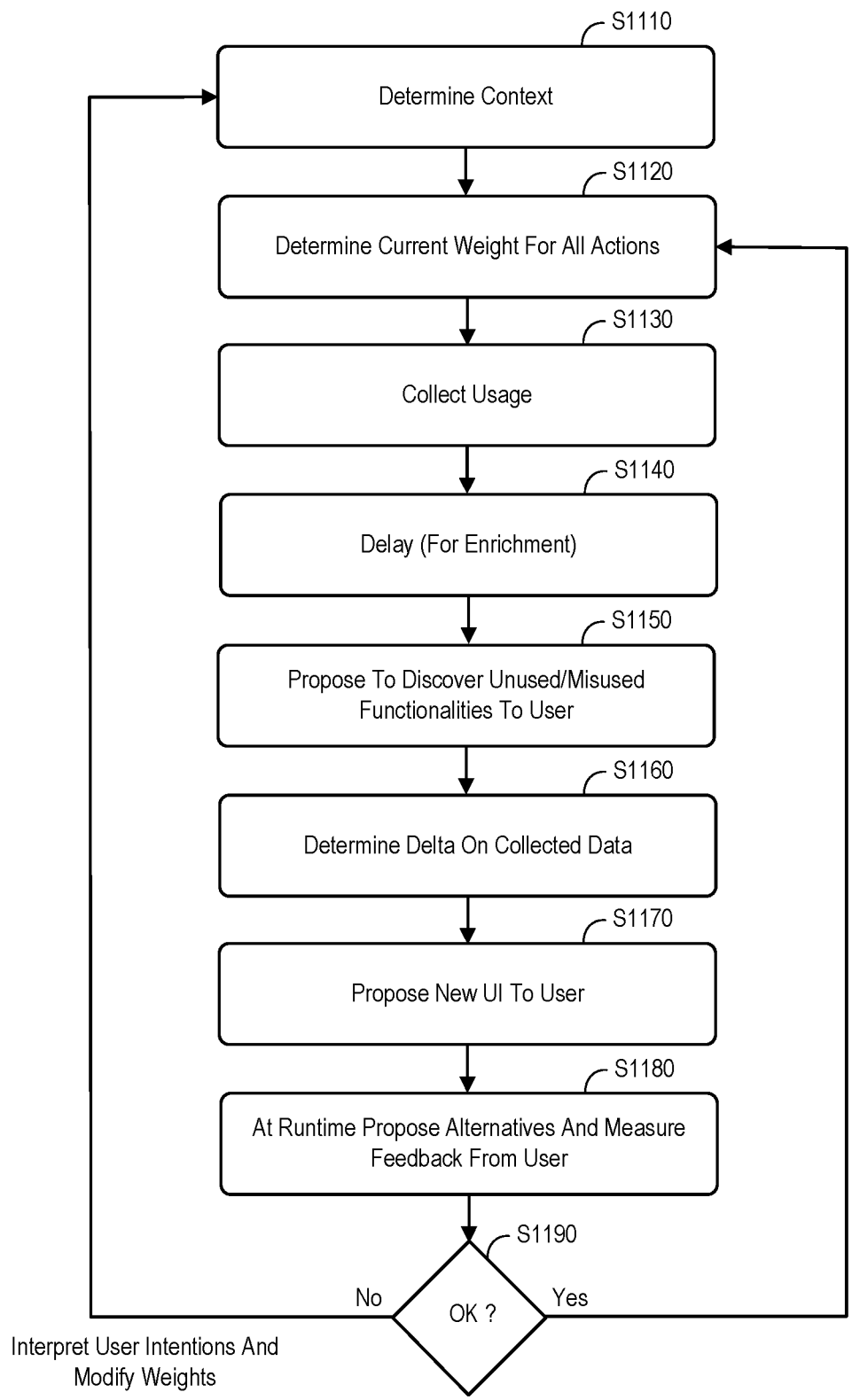
FIG. 11 is another user interface polymorphism method according to some embodiments.

FIG. 11 is another user interface polymorphism method according to some embodiments. At S1110, the system may determine context information (create/authoring, consumption, type of document, data source, etc.) to fine tune data triage. At S1120, the current weight for all actions may be determined (e.g., as predicted by a software developer). At S1130, the system may collect usage data and at S1140 an enrichment delay may let the system collect additional information (until a sufficient and meaningful amount has been gathered).

At S1150, the system may propose to discover unused/misused functionalities to user. At S1160, the system may determine deltas of the collected data to optimize results and decisions (e.g., to produce new temporary states and communicate the states to intelligent areas to set new user interface locations). The system may also modify the states if areas reorganized them based on any associated limitations (e.g., a pull-down menu grows too large).

At S1170, the system may create a new user interface for the user (and prepare explanations about where the relocated unused functionalities have moved, highlight useful functionalities that have not been used, etc.). At S1180, during runtime, if usage patterns have been recognized, the system propose alternatives, advice, and/or optimizations. The system may also measure feedback from end-user. If the user is OK with the changes at S1190, the method may continue at S1120. If the user is not OK with the changes at S1190, the system may interpret the intent of the user, modify weights, and the method may continue at S1110.

Figure 12:
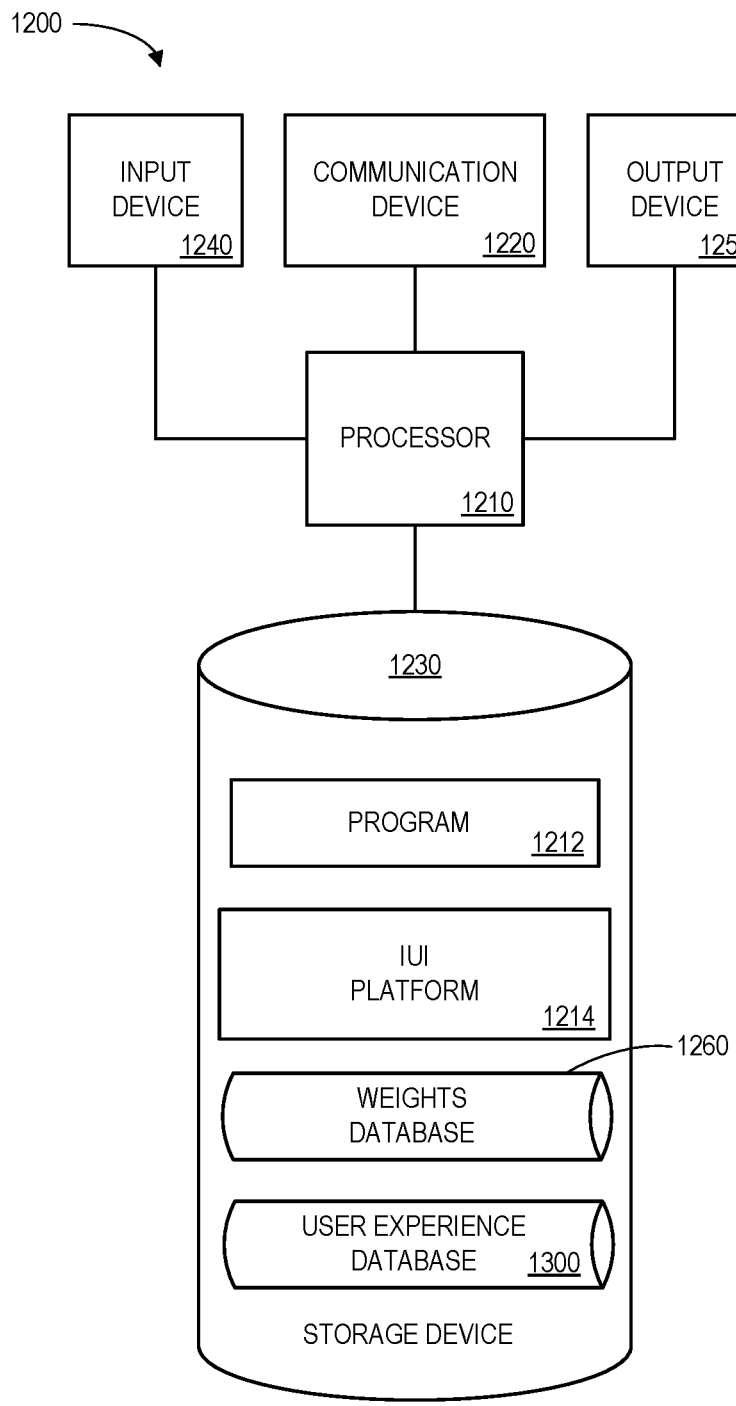
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the system 200 of FIG. 2 (and/or any other system described herein). The platform 1200 comprises a processor 1210, such as one or more commercially available CPUs in the form of one-chip microprocessors, coupled to a communication device 1220 configured to communicate via a communication network (not shown in FIG. 12). The communication device 1220 may be used to communicate, for example, with one or more remote user platforms, cloud resource providers, etc. The platform 1200 further includes an input device 1240 (e.g., a computer mouse and/or keyboard to input rules or logic) and/an output device 1250 (e.g., a computer monitor to render a display, transmit recommendations, and/or create reports). According to some embodiments, a mobile device and/or PC may be used to exchange information with the platform 1200.

The processor 1210 also communicates with a storage device 1230. The storage device 1230 can be implemented as a single database or the different components of the storage device 1230 can be distributed using multiple databases (that is, different deployment information storage options are possible). The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or Intelligent User Interface ("IUI") platform 1214 for controlling the processor 1210. The processor 1210 performs instructions of the programs 1212, 1214, and thereby operates in accordance with any of the embodiments described herein. For example, the processor 1210 may collect user experience data associated with a user's interactions with the application over time (e.g., user actions, touchscreen interactions, computer mouse clicks, attention information, context information, etc.). The processor 1210 may then analyze the user experience data (e.g., looking for most visited interface locations, most used actions, infrequently accessed functions, common user mistakes, etc.). The processor 1210 may also automatically create a user interface design adjustment based on the analysis. For example, the user interface design adjustment might be associated with a menu item, a sub-menu item, an application action, an icon location, adding a display element, removing a display element, etc.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a weights database 1260 and a user experience database 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 illustrates a user experience database in accordance with some embodiments.

Referring to FIG. 13, a table is shown that represents the user experience database 1300 that may be stored at the platform 1200 according to some embodiments. The table may include, for example, entries associated with user interface updates. The table may also define fields 1302, 1304, 1306, 1308, for each of the entries. The fields 1302, 1304, 1306, 1308 may, according to some embodiments, specify: a user interface identifier 1302, an interface element identifier 1304, a current weight 1306, and a proposed adjustment 1308. The user experience database 1300 may be created and updated, for example, when a user application is launched and/or a user interacts with the application.

The user interface identifier 1302 may be a unique alphanumeric identifier that is associated with a particular application, user, and/or context. The interface element identifier 1304 might identify a component of a user interface, such as a button, toolbar, menu item, etc. The current weight 1306 might reflect how often the user interacts with the component (e.g., after starting at an initial default value). The proposed adjustment 1308 might indicate that the component will be promoted (e.g., made more prominent) or demoted (e.g., made less prominent).

Thus, embodiments may provide user interface customization in an automatic and appropriate manner. The proposed systems and methods may solve user experience problems by learning from user actions. Embodiments may generate a return on investment such as by reducing complexity, providing better user profiling, helping to discover functionality, targeting unforeseen use cases, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
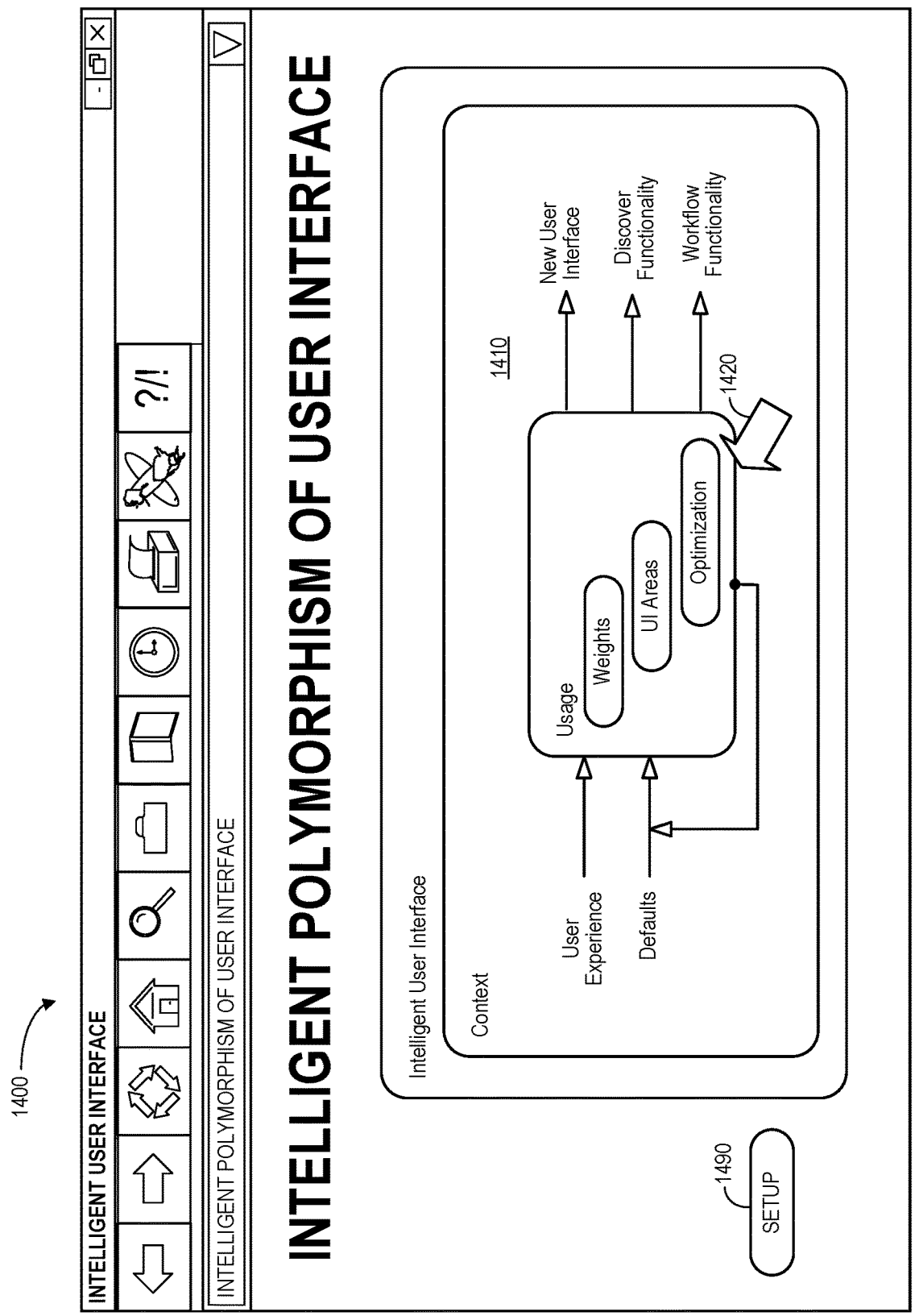
FIG. 14 is an intelligent user interface display according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 14 is a human machine interface display 1400 according to some embodiments. The display 1400 includes a graphical representation 1410 of elements of an intelligent user interface system. Selection of an element (e.g., via a touchscreen or computer pointer 1420) may result in display of a popup window containing various options (e.g., to adjust rules or logic, assign various optimization rules, etc.). The display 1400 may also include a user-selectable "Setup" icon 1490 (e.g., to configure parameters to alter or adjust processes as described with respect any of the embodiments described herein).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a user interface design for an application, comprising:
an intelligent user interface platform, including:
a computer processor, and
a memory storage device including instructions that, when executed by the computer processor, enable the intelligent user interface platform to:
(i) collect user experience data associated with a user's interactions with the application over time, the application including at least one toolbar displayed via a user interface, the user experience data comprising attention information detected by a camera, the attention information indicating where a user is looking while interacting with the application and an identification of the user's most common mistakes while interacting with the application,
(ii) analyze the user experience data, and
(iii) automatically create a user interface design adjustment based on the analysis, wherein the user interface design adjustment comprises adding at least one display item to the at least one toolbar, removing a second display item from the at least one toolbar, and displaying the second display item as a standalone button item on the user interface.

2. The system of claim 1, wherein the user experience data is further associated with at least one of: (i) user actions, (ii) touchscreen interactions, (iii) computer mouse clicks, (iv) context information, (v) a document type, or (vi) a time and date.

3. The system of claim 1, wherein said analysis is associated with at least one of: (i) most visited interface locations, (ii) most used actions, (iii) infrequently accessed functions, (iv) multiple users, or (v) multiple applications.

4. The system of claim 1, wherein said analysis is associated with at least one of: (i) artificial intelligence, and (ii) machine learning.

5. The system of claim 1, wherein the user interface design adjustment is further associated with at least one of: (i) a menu item, (ii) a sub-menu item, (iii) an application action, (iv) an icon location, and (v) removing a display element.

6. The system of claim 1, wherein the intelligent user interface platform is further to propose the user interface design adjustment to the user.

7. The system of claim 6, wherein the intelligent user interface platform is further to implement the user interface design adjustment based on a response to the proposal.

8. The system of claim 7, wherein the intelligent user interface platform is further to receive user feedback information about the user interface design adjustment.

9. The system of claim 1, further including:
an optimization engine to recognize user patterns and propose optimized workflows.

10. A computer-implemented method associated with a user interface design for an application, comprising:
collecting, by a computer processor of an intelligent user interface platform, user experience data associated with a user's interactions with the application over time, the application including at least one toolbar displayed via a user interface, the user experience data comprising attention information detected by a camera, the attention information indicating where a user is looking while interacting with the application and an identification of the user's most common mistakes while interacting with the application;
analyzing the user experience data; and
automatically creating a user interface design adjustment based on the analysis, wherein the user interface design adjustment comprises adding at least one display item to the at least one toolbar, removing a second display item from the at least one toolbar, and displaying the second display item as a standalone button item on the user interface.

11. The method of claim 10, wherein the user experience data is further associated with at least one of: (i) user actions, (ii) touchscreen interactions, (iii) computer mouse clicks, (iv) context information, (v) a document type, or (vi) a time and date.

12. The method of claim 10, wherein said analysis is associated with at least one of: (i) most visited interface locations, (ii) most used actions, (iii) infrequently accessed functions, (iv) multiple users, or (v) multiple applications.

13. The method of claim 10, wherein said analysis is associated with at least one of: (i) artificial intelligence, and (ii) machine learning.

14. The method of claim 10, wherein the user interface design adjustment is further associated with at least one of: (i) a menu item, (ii) a sub-menu item, (iii) an application action, (iv) an icon location, and (v) removing a display element.

15. The method of claim 10, wherein the intelligent user interface platform is further to propose the user interface design adjustment to the user.

16. The method of claim 15, wherein the intelligent user interface platform is further to implement the user interface design adjustment based on a response to the proposal.

17. The method of claim 16, wherein the intelligent user interface platform is further to receive user feedback information about the user interface design adjustment.

18. The method of claim 10, further including:
an optimization engine to recognize user patterns and propose optimized workflows.

19. A non-transitory, computer readable medium having executable instructions stored therein that, when executed by a computer processor cause the processor to perform a method associated with a user interface design for an application, the method comprising:
collecting, by a computer processor of an intelligent user interface platform, user experience data associated with a user's interactions with the application over time, the application including at least one toolbar displayed via a user interface, the user experience data comprising attention information detected by a camera, the attention information indicating where a user is looking while interacting with the application and an identification of the user's most common mistakes while interacting with the application;
analyzing the user experience data; and
automatically creating a user interface design adjustment based on the analysis, wherein the user interface design adjustment comprises adding at least one display item to the at least one toolbar, removing a second display item from the at least one toolbar, and displaying the second display item as a standalone button item on the user interface.

20. The non-transitory, computer readable medium of claim 19, wherein the user experience data is further associated with at least one of: (i) user actions, (ii) touchscreen interactions, (iii) computer mouse clicks, (iv) context information, (v) a document type, or (vi) a time and date.

* * * * *